United States Patent

[11] 3,607,641

| [72] | Inventors | Robert Lind;<br>Norman Price, both of Warrington, England |
|---|---|---|
| [21] | Appl. No. | 702,735 |
| [22] | Filed | Feb. 2, 1968 |
| [45] | Patented | Sept. 21, 1971 |
| [73] | Assignee | United Kingdom Atomic Energy Authority<br>London, England |
| [32] | Priority | Feb. 28, 1967 |
| [33] | | Great Britain |
| [31] | | 9482/67 |

[54] GRAPHITE MODERATOR STRUCTURES FOR NUCLEAR REACTORS
3 Claims, 7 Drawing Figs.

[52] U.S. Cl.................................................. 176/59, 176/61
[51] Int. Cl..................................................... G21c 19/28
[50] Field of Search............................................ 176/59, 61

[56] References Cited
UNITED STATES PATENTS
| 3,296,084 | 1/1967 | Fawcett et al. ............... | 176/59 |
| 3,365,366 | 1/1968 | Cundill........................ | 176/59 |

*Primary Examiner*—Reuben Epstein
*Attorney*—Larson, Taylor & Hinds

ABSTRACT: A graphite-moderated nuclear reactor with a reentrant core is provided with means for inducing coolant flowing through the moderator to diffuse into the moderator. The means may comprise flow restrictors in the coolant flow path whereby a pressure drop is created across individual graphite bricks forming the moderator, and gas seals between the bricks. To facilitate sealing, engagement between bricks stacked in columns is in the peripheral region by recesses and separate keys pegged in position, leaving internal annular plane continuous surfaces in and between which a sealing ring is provided.

GRAPHITE MODERATOR STRUCTURES FOR NUCLEAR REACTORS

BACKGROUND OF THE INVENTION

This invention relates to graphite moderator structures for nuclear reactors.

British Pat. Spec. No. 822,714 discloses a graphite-moderated, fluid-cooled nuclear reactor having means for constraining at least a portion of the fluid coolant entering the reactor to flow through the graphite moderator, to be reversed at one end of the moderator and then to flow, in contradirection to that of the flow through the moderator, in contact with fuel elements orientated in channels in the moderator. Such a nuclear reactor will be hereinafter referred to as a nuclear reactor of the kind described.

SUMMARY OF THE INVENTION

According to the present invention a nuclear reactor of the kind described is provided with means inducing coolant flowing through the moderator to diffuse into the moderator.

The means may comprise flow restrictors in the coolant flow paths whereby a pressure drop is created across individual graphite bricks forming the moderator, and gas seals between the bricks.

Diffusion of coolant into the moderator is considered desirable in highly rated carbon-dioxide-cooled, graphite-moderated nuclear reactors in which reaction between the coolant and the moderator is inhibited by the introduction of additives to the coolant. Reaction may occur preferentially in the interior of the bricks forming the graphite moderator unless steps are taken to induce diffusion of the inhibiting additive with the coolant.

DESCRIPTION OF THE DRAWINGS

An embodiment of the invention will now be described by way of example only with reference to the accompanying drawings wherein.

DESCRIPTION OF THE PREFERRED EMBODIMENTS

Figure 1:
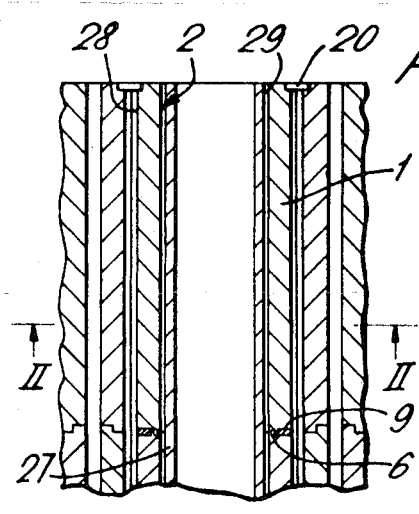
FIG. 1 is a fragmentary side view in section of part of a reactor.
Figure 2:
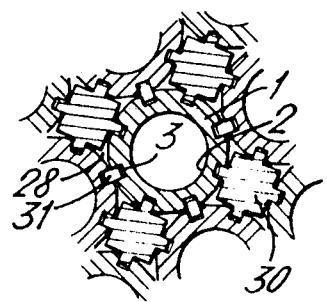
FIG. 2 is a section on the line II—II of FIG. 1.
Figure 3:
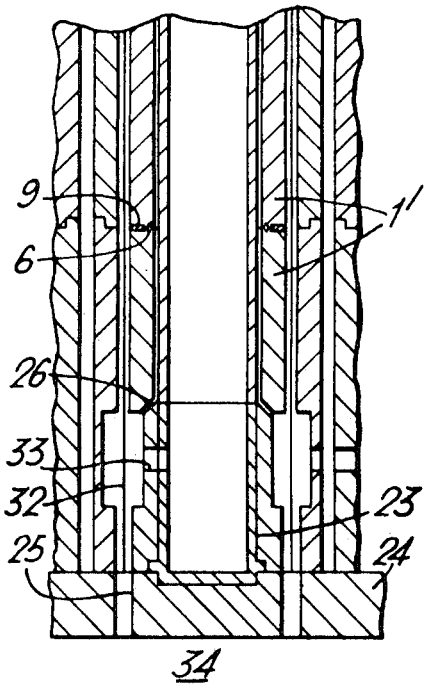
FIG. 3 is a plan view of a detail on an enlarged scale.
Figure 3:
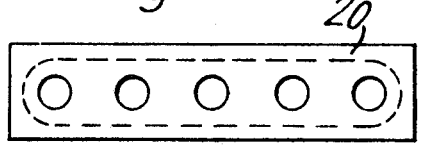

In FIG. 1 of the drawings is shown a column of prismatic, sixteen-sided graphite bricks 1, 1' carried on a support plate 24. The bricks each have a central bore 2 in which is housed a fuel element having a sleeve 27. Only the sleeve is relevant to the present embodiment and the rest of the fuel element is therefore not shown. The fuel element is carried on a stool 23. Between the sleeve 27 and the graphite bricks 1, 1' is an annulus 29. The column of bricks 1, 1' engage columns of interstitial bricks 30 (see FIG. 2). Eight longitudinal keyways 3 equiangularly spaced around each of the bricks 1, 1' are provided for radial keys 31 which key the columns together. Spaces between the columns provide passages 28 which extend the length of the graphite column. At their lower end the passages 28 finish in a chamber 32 to which the annulus 29 is also connected via a restrictor 26. A passageway 33 connects the chamber 32 with the inside of the sleeve 27 and a bypass 25 connects it with a gas space 34 below the support plate 24. At the upper ends of the passages 28 are restrictors 20 shown in FIG. 3. Between alternate keyways 3 of the bricks 1, 1' are provided radial recesses 4 in both end faces of the bricks 1, 1', only those on adjacent end faces which appear in FIG. 4 being shown. Each recess 4 has a rounded inner blind end 4' which terminates short of the bore 2 of the respective brick, but which extends further towards the bore than do the floors of the keyways 3. There is thus provided an annular plane continuous surface 5 on the end faces of each brick which, when the bricks are in operative position, contacts with the registering surface 5 of the adjacent bricks. In order to prevent coolant from being able to leak from the outside of each brick between end faces of adjacent bricks in each stack, to the central registering bores of the bricks in the stack, a sealing ring 6 is accommodated in registering circular grooves 7 of generally rectangular section provided in the surfaces 5 and disposed equidistantly between the bore and the blind ends of the recesses 4. The opening of each groove 7 is flared at 8 to provide a lead-in for the sealing ring 6 and thus assist assembly.

Figure 4:
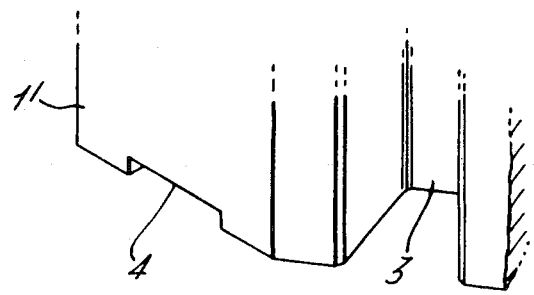
FIG. 4 is a fragmentary exploded perspective view of portions of two adjacent bricks of a stack constituting a column of the nuclear reactor moderator structure shown in FIG. 1.
Figure 4:
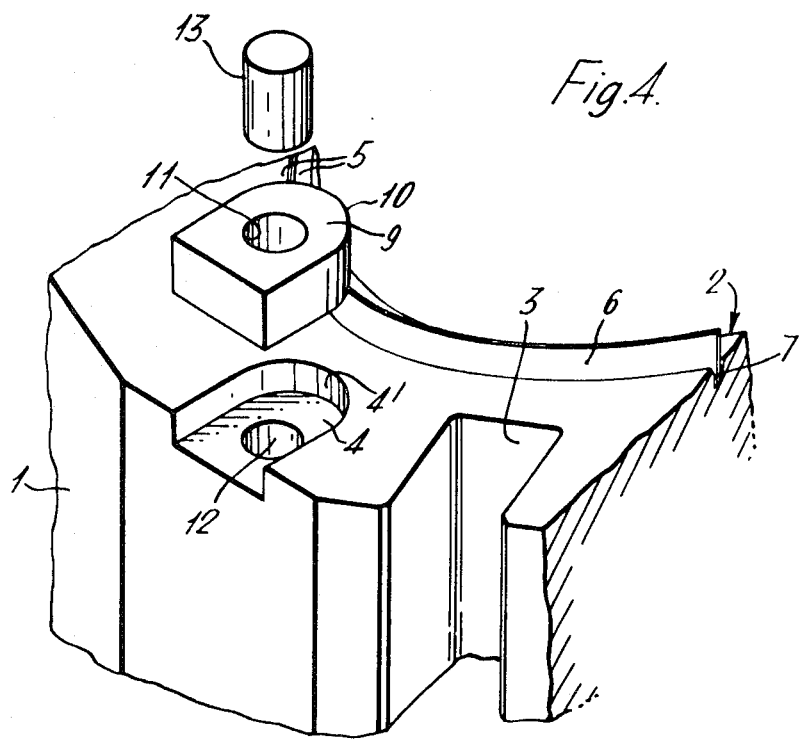
Figure 7:
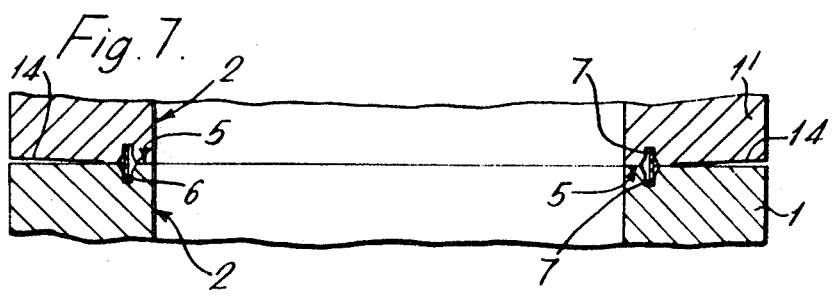
FIG. 6 is a side view in section on line VI—VI of FIG. 5 and showing the upper brick of FIG. 4 in engaged position and FIG. 7 is a similar view to FIG. 6, taken on line VII—VII of FIG. 5.
Figure 5:
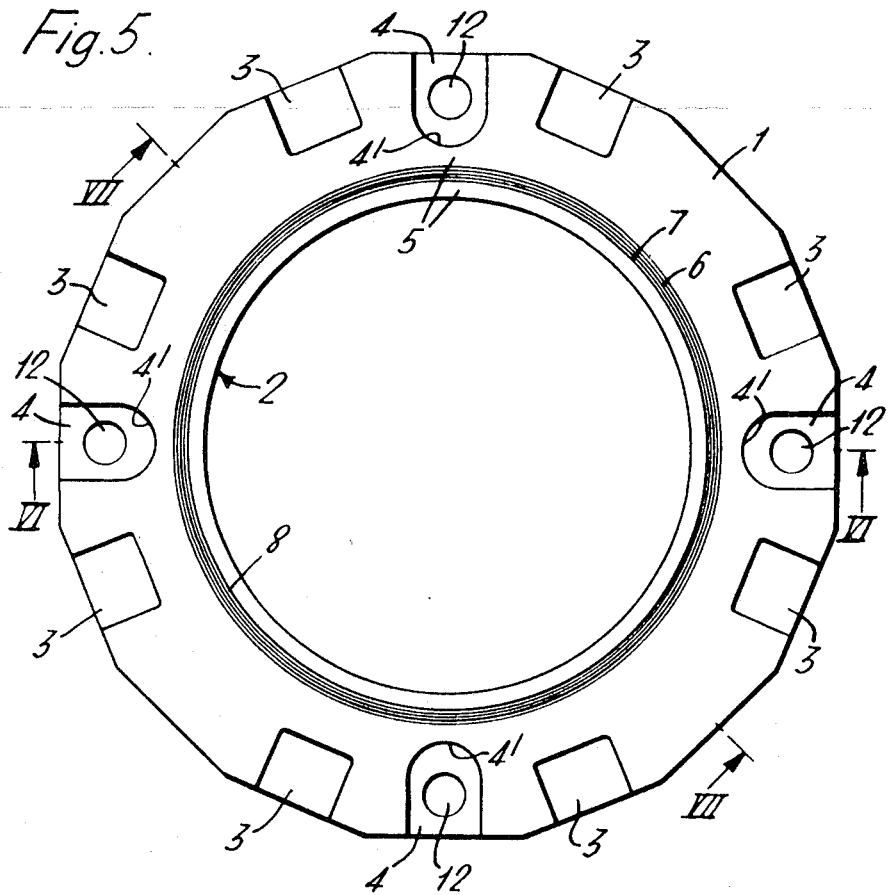
FIG. 5 is a plan view from above of the lower of the bricks shown in FIG. 4.
Figure 6:
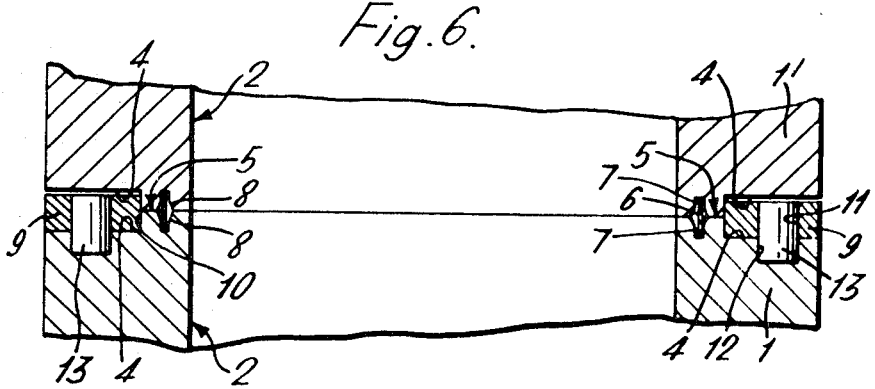

The bricks 1, 1' are located endwise by providing keys 9 which are shaped to engage the recesses 4, having rounded inner edges 10, and whose height is a little less than twice the depth of each recess 4 (as can be seen in FIG. 6) whereby the top of each key 9 whilst being accommodated in registering recesses 4 is out of contact with the floor of the recess 4 in the upper of adjacent bricks (brick 1' in FIGS. 4 and 6). To retain the keys 9 in the recesses 4, each key has an aperture 11 and the recesses 4 in the upper end of each brick (e.g. brick 1 in FIGS. 4 and 6) each have a blind hole 12 in the floor thereof. A graphite dowel 13 engages the aperture 11 and hole 12 to lock each key in position, the top of the dowel lying flush with the top of the key. The clearance (typically 0.1 inches) between the top of each key (and the top of the dowel flush with it) and the floor of each upper recess 4 saves the key and dowel from being damaged should the bricks rock after prolonged operation. Provision for rocking consists of relieving the unrecessed lower end surface of the upper of adjacent bricks (1' in FIGS. 4 and 7), producing relieved portions 14 as can be seen in FIG. 7. A typical gap at the outside surface of the block produced by the relieving is 0.1 inches. The relieving does not extend into the annular surfaces 5.

Typical dimensions for a brick provided according to the foregoing description are:

Brick height 32 inches
Brick width 15.37 inches across opposed faces
Brick bore diameter 9.6 inches
Distance between opposed blind ends of recesses 4: 11.6 inches
Centerline diameter of grooves 7: 10.6 inches
Depth of recesses 4: 0.375 inches
Depth of key 9: 0.65 inches
Width of key 1.6 inches
Height of dowel 13: 1.15 inches
Diameter of dowel 0.75 inches
Depth of blind hole in recess 4: 0.50 inches The arrangement of keys 9, recesses 4 and their blind ends 4', dowels 13, apertures 11 and blind holes 12 serve to locate the bricks 1, 1' so that the bores 2 of adjacent bricks remain in register. In order to simplify assembly and ensure that the sealing ring 6 is properly fitted in the grooves 7, it is preferable to employ and expanding mandrel engaging the bores 2 of adjacent bricks when laying an upper brick onto a lower brick during core assembly, whereby exact bore registration is ensured.

The sealing ring 6 is made of sufficient depth to remain in engagement with both grooves 7 in the event that the bricks rock relative to one another during operation as allowed by the relieved portions 14. A typical sealing ring depth is 0.75 inches, with the groove 7 depth 0.375 inches and width 0.0625 inches.

In operation of the reactor coolant flow is directed downwardly through the passage 28 and annulus 29 and then reverses to flow upwardly through the sleeve 27 over the fuel elements. Because of the flow restrictors 20 at the upper end of the passages 28 and the flow restrictors 26 at the base of the annulus 29 a parasitic pressure drop is created radially across the bricks 1, 1' and by sealing the bricks together coolant is induced to diffuse through the bricks, the restrictors 20, 26 being arranged to provide a substantially constant pressure drop radially across the graphite bricks at all levels in the moderator structure.

Since the graphite of the moderator may undergo distortion during operation of the reactor it is considered preferable for each seal to be built up of short lengths scarfed together. One design consists of a graphite ring built up of eight equal arcuate segments with overlapping rebates where they join. In section the ring is basically rectangular but the middle of each face is cut away. On differential dimensional changes of adjacent bricks the grooves 7 into which the ring fits could be displaced radially relative to each other and by virtue of the cutting away and relieving the various segments could tilt to maintain the seal. The stress problems involved are eased by the property of creep.

Where neutron absorption can be tolerated, a metal sealing ring can be used. One design uses three stainless-steel segments whose section is that of a strip with its edges loosely folded back on itself. One end of each segment is cut away to provide a tongue which enters into the space between the body of the next segment and the next segment's bent over edges. Sufficient room is left between the segments to allow for the expected shrinkage, which is calculable, but these spaces are filled by the tongues. The seals are a comparatively tight fit in the grooves.

The number of segments in each case depends on the ductility strength and creep of the seal material in relation to the expected distortion and rate of distortion. The depth of the grooves in the member is also governed by the distortion expected which could result in the members having a wedge-shaped separation between them.

We claim:

1. A graphite-moderated, fluid-cooled nuclear reactor having means for constraining a portion of the fluid coolant entering the reactor to flow-through the graphite moderator, to be reversed at one end of the moderator and then to flow in contradirection to that of the flow through the moderator, in contact with fuel elements orientated in channels in the moderator, and means inducing coolant flowing through the moderator to diffuse into the moderator.

2. A graphite-moderated, fluid-cooled nuclear reactor as claimed in claim 1 wherein the means inducing coolant flowing through the moderator to diffuse into the moderator comprises flow restrictors in the coolant flow paths whereby a substantially constant pressure drop is created across individual graphite bricks forming the moderator, and gas seals between the bricks.

3. A graphite-moderated fluid-cooled nuclear reactor as claimed in claim 1 wherein the moderator comprises graphite bricks stacked in columns, each brick has a longitudinal bore registering with the bores of adjacent bricks in each column to provide a longitudinal channel for housing fuel elements, an annular passage of a first type is provided around each of said fuel housing channels, further passages of a second type are provided between the bricks in adjacent columns, coolant constrained to flow through the moderator flows through said passages of first and second types before combining to flow in contradirection through the fuel housing channels, and the means for inducing coolant flowing through the moderator to diffuse into the moderator comprises flow restrictors located at the inlets of the passages of one type and at the outlets of the passages of the other type whereby a pressure drop is created across the individual graphite bricks forming the moderator.